United States Patent [19]

Fleischer

[11] 4,169,437
[45] Oct. 2, 1979

[54] SPEED CONTROL SYSTEM FOR A VEHICLE
[75] Inventor: Helmut Fleischer, Schwieberdingen, Fed. Rep. of Germany
[73] Assignee: Robert Bosch GmbH, Stuttgart, Fed. Rep. of Germany
[21] Appl. No.: 853,927
[22] Filed: Nov. 22, 1977
[30] Foreign Application Priority Data
Jan. 15, 1977 [DE] Fed. Rep. of Germany ....... 2701567
[51] Int. Cl.$^2$ .................................................. B60K 31/00
[52] U.S. Cl. .............................. 123/102; 123/103 E
[58] Field of Search .................... 123/102, 103 E, 118
[56] References Cited
U.S. PATENT DOCUMENTS

| | | | |
|---|---|---|---|
| 3,800,904 | 4/1974 | Zelenka ................................. | 123/102 |
| 3,885,137 | 5/1975 | Ooya et al. ............................ | 123/102 |
| 3,889,647 | 6/1975 | Rachel ................................... | 123/102 |
| 3,891,046 | 6/1975 | Oiches ................................... | 123/102 |
| 3,938,611 | 2/1976 | Bertolasi ................................ | 123/102 |
| 3,952,829 | 4/1976 | Gray ...................................... | 123/102 |
| 4,010,720 | 3/1977 | Gram ................................. | 123/103 E |
| 4,019,475 | 4/1977 | Nuss ................................... | 123/103 E |
| 4,034,725 | 7/1977 | Ito et al. ................................ | 123/102 |
| 4,036,323 | 7/1977 | Schmall ................................. | 123/102 |
| 4,075,983 | 2/1978 | Robinson .............................. | 123/102 |
| 4,075,988 | 2/1978 | Kato ...................................... | 123/102 |
| 4,078,631 | 3/1978 | Kadota et al. ........................ | 123/102 |
| 4,086,888 | 5/1978 | Roberts ................................. | 123/102 |
| 4,095,570 | 6/1978 | Sheffer et al. ........................ | 123/102 |
| 4,098,242 | 7/1978 | Anderson .............................. | 123/102 |

Primary Examiner—Charles J. Myhre
Assistant Examiner—R. A. Nelli
Attorney, Agent, or Firm—Edwin E. Greigg

[57] ABSTRACT

A speed control system for a vehicle, especially an internal combustion powered vehicle, includes a driver-settable member which has up to four distinct regions of adjustment, namely idling, deceleration, cruising and acceleration. The cruising region includes a mechanical or other pressure point to provide a sensible signal to the operator of the vehicle indicating the constant speed region. The apparatus of the invention prescribes a function generator which generates a voltage as a non-linear function of the driver-settable member and supplies it to a voltage-controlled oscillator. The output signal of the oscillator is fed to an integrating stage whose direction of integration is controlled by suitable logical circuits which detect the region occupied by the driver-settable member and the difference between the set-point value supplied by the integrator and the actual vehicle or engine speed. Other circuitry controls idling rpm.

14 Claims, 8 Drawing Figures

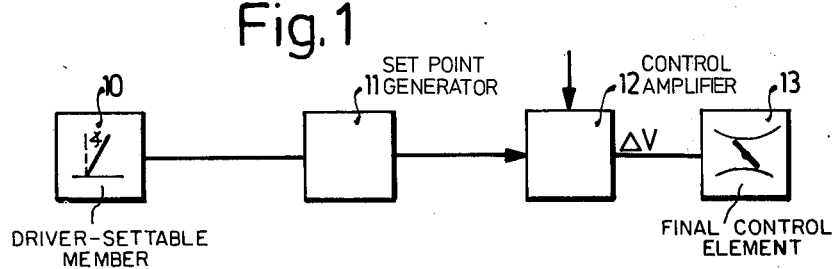
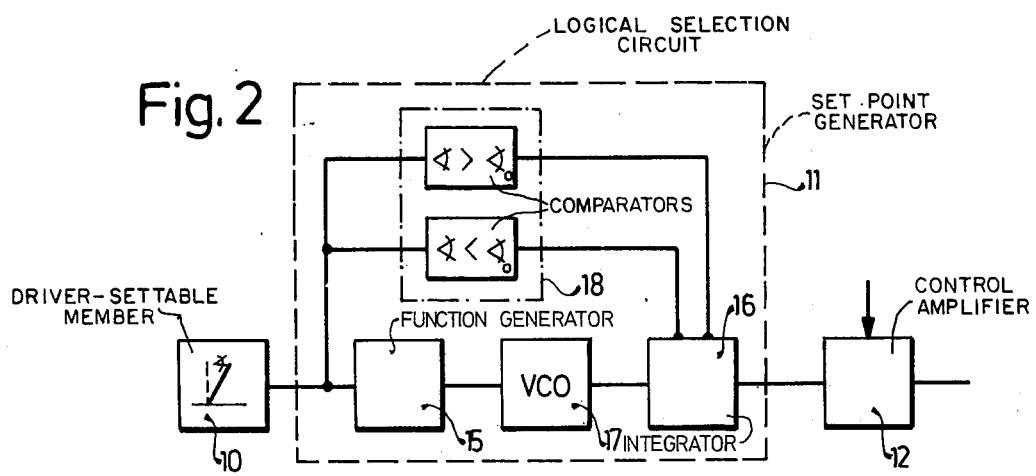
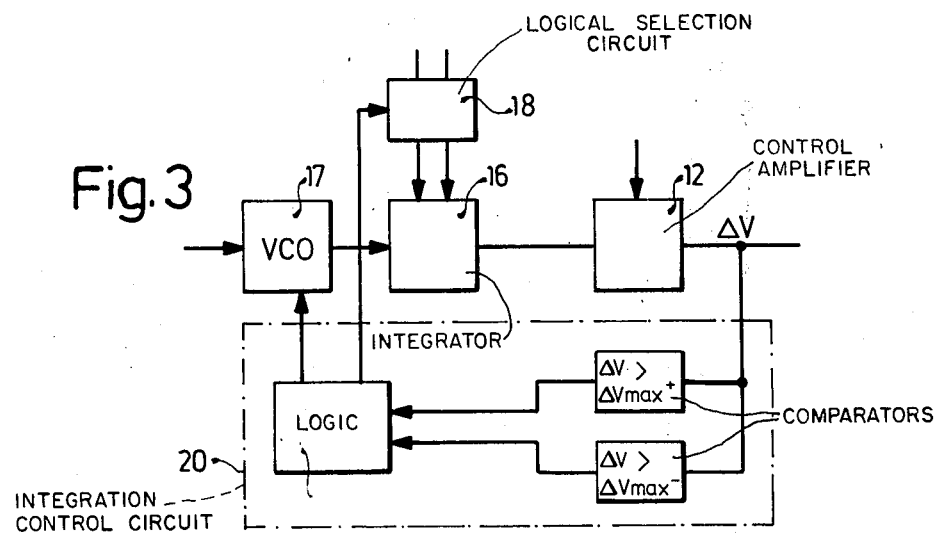

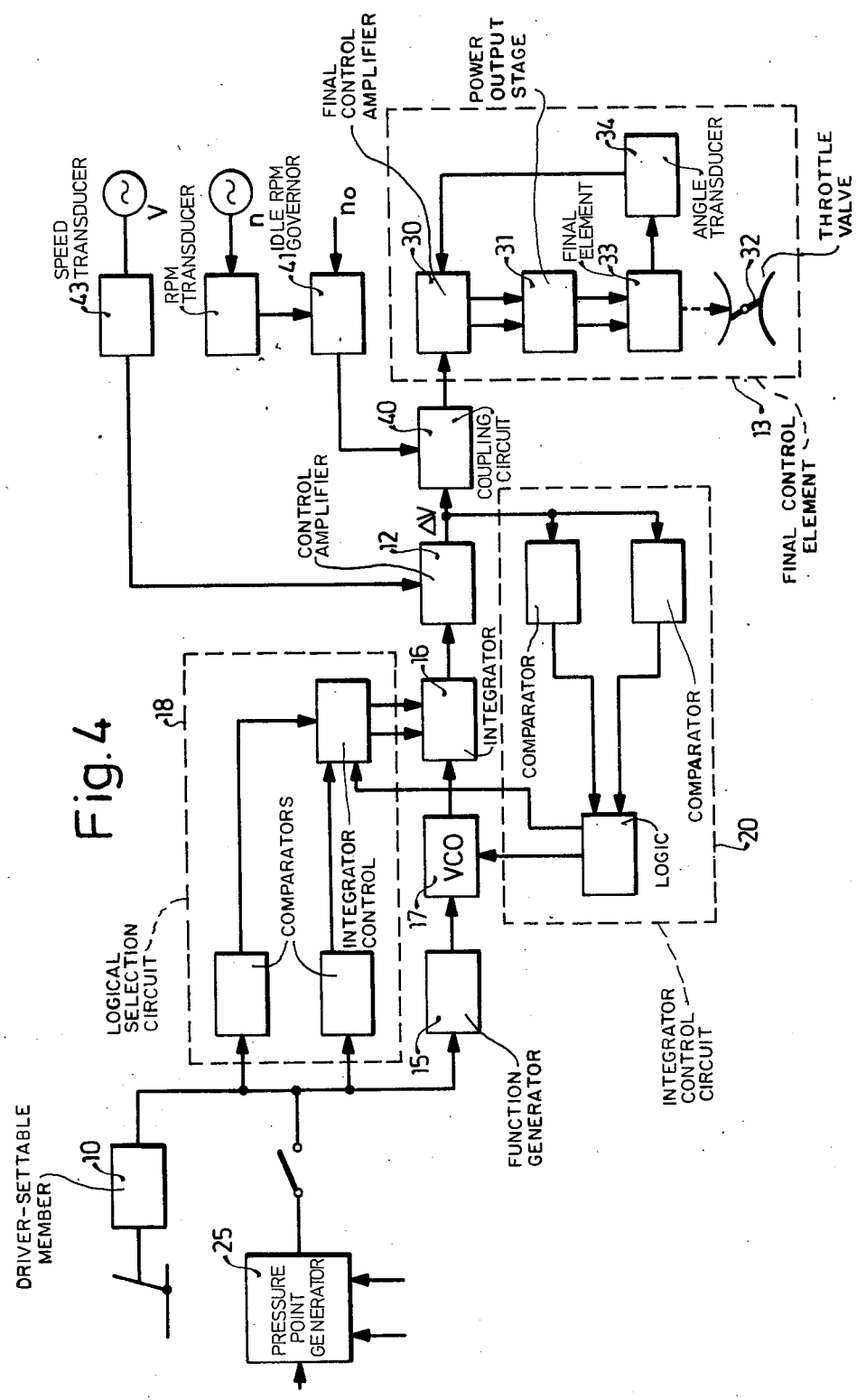

SPEED CONTROL SYSTEM FOR A VEHICLE

BACKGROUND OF THE INVENTION

The invention relates to an automatic speed control mechanism for motor vehicles. Such mechanisms, sometimes called cruise controls, include a set-point generator in which a desired nominal speed is selected, either by the accelerator pedal or in a manual control and where a feedback controller maintains the vehicle at the desired speed within the range of the control loop. It is the position of the gas pedal or the manual control which sets the desired speed. As a consequence, in large domains of operation, especially at low and medium speeds and during accelerating processes, the engine operates with relatively high specific fuel consumption because the direct coupling of the accelerator throttle valve to the gas pedal does not allow for an optimization of the fuel consumption when automatic speed control is in operation.

OBJECT AND SUMMARY OF THE INVENTION

It is thus a principal object of the invention to provide a cruise control apparatus for motor vehicles which maintains the vehicle speed as indicated by the driver at the same time as it maintains engine operation in accordance with minimum fuel consumption. This and other objects are attained according to the invention by providing an apparatus which includes a driver-settable adjustment member and a control system for setting the desired vehicle speed. As a particular feature of the invention, the driver-settable adjustment member actuates a function generator circuit which generates a voltage that is supplied to an integrating circuit which delivers a signal indicative of the nominal or set-point value of the vehicle as selected by the driver via the driver-settable adjustment member. Preferably, the invention further includes a mechanical pressure point indicator which provides a sensible pressure point beyond which the vehicle is to be accelerated and below which the vehicle is to be decelerated. It is a further object of the invention to provide a cruise control mechanism which provides smooth transitions between the various domains of operation, i.e., deceleration, constant speed and acceleration. This particular object is attained by the insertion of the above-mentioned function generator. While the invention makes it possible for the driver to indicate directly a desired speed change for the vehicle, the automatic control permits the adjustment of that speed in a manner consistent with minimum fuel consumption.

It is a further object and a particular feature of the invention to include an idling governor which is coupled to the driver settable adjustment member so as to further improve fuel consumption and driver comfort.

The invention will be better understood as well as further objects and advantages thereof become more apparent from the ensuing detailed description of a preferred exemplary embodiment of the invention taken in conjunction with the drawing.

BRIEF DESCRIPTION OF THE DRAWING

FIG. 1 is a simplified block diagram of the cruise control apparatus according to the invention;

FIG. 2 is a block diagram of the invention in which the set-point generator is shown in greater detail;

FIG. 3 is a detail of the circuit of FIG. 2 including an integrator control circuit 20;

FIG. 4 is a detailed block diagram of the overall cruise control apparatus of the invention;

DESCRIPTION OF THE PREFERRED EMBODIMENT

Figure 5:
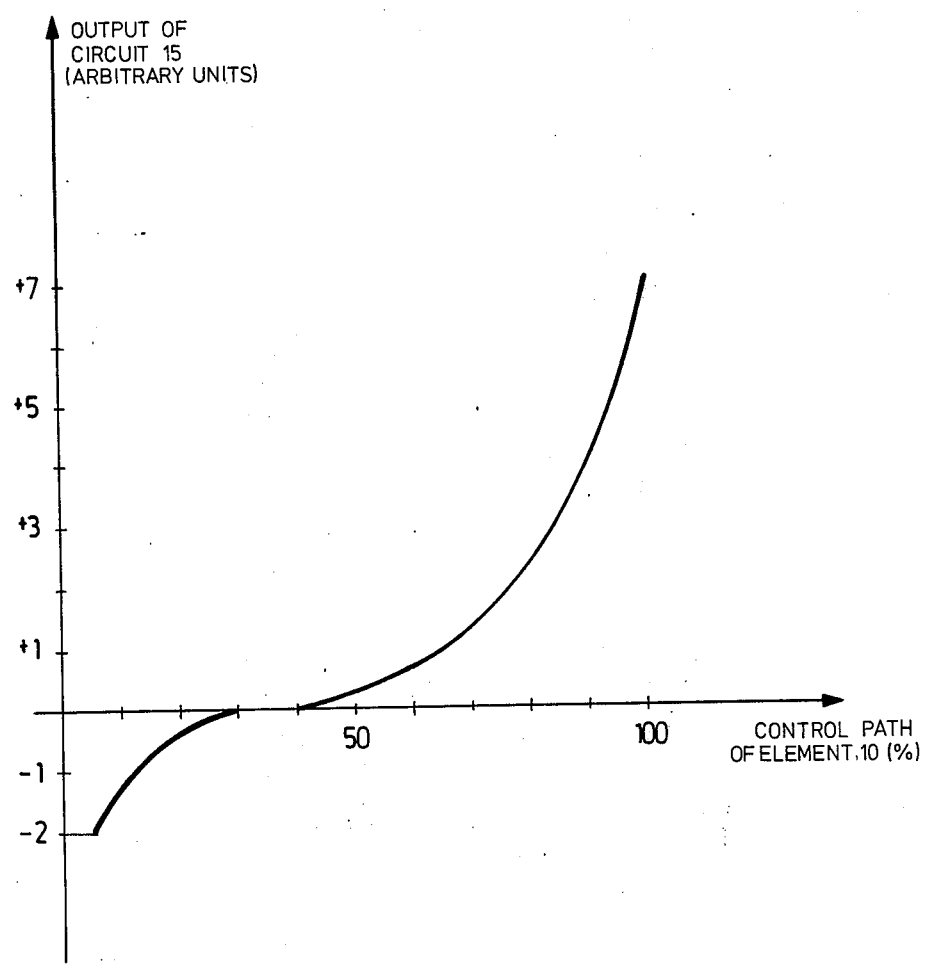
FIG. 5 is a diagram illustrating the output control signal of the function generator as a function of the position of the driver-settable member.

Turning now to FIG. 1, there will be seen a greatly simplified block diagram of the invention including a driver-settable member 10, for example the accelerator pedal, for setting the degree of acceleration or deceleration of the vehicle. Following the member 10 is a speed set-point generator 11 which supplies its signal to a control amplifier 12 which controls a final control element 13 that acts, for example, on the throttle valve of the engine.

It is a particular characteristic of the invention that the member 10 is a driver-settable member, the position of which is transduced by the set-point generator 11 to provide a signal directly related to the driver-selected position. The set-point value for the speed of the vehicle and the actual speed signal are then fed to a control amplifier 12 which generates an output signal related to the difference between the nominal and set-point input signals and which actuates the final control element 13. In the illustrated case, the final control element 13 sets the position of the throttle valve of an internal combustion engine whose relative angle with respect to the induction tube thus depends on the input signal to the speed control amplifier 12. It is possible and suitable, however, to interpose an actuator device between the control amplifier 12 and the throttle plate so as to permit operation of the engine in the most favorable fuel consumption domain.

FIG. 2 is a more detailed block diagram of the cruise control system according to the invention as illustrated in FIG. 1. In FIG. 2, the set-point generator 11 is shown in greater detail including a function generator amplifier with diodes-resistors-network 15, which provides a signal to a voltage-controlled oscilator 17 RCA CD 4046 which, in turn, is used as an input for an integrating circuit 16 RCA, CD 4029 whose direction of integration is controlled by a logical selection circuit 18. The speed control or cruise control system as illustrated in FIG. 2 functions in the following way. The driver-settable member 10 generates an output signal which feeds the function generator 15 and which is also supplied to the logical selection circuit 18. The output signal of the function generator 15 is used to control the input circuit for the integrator 16 which is embodied in this case as a voltage-controlled oscillator. The output frequency of the voltage-controlled oscillator 17 thus depends on the position of the driver-settable member 10, i.e., depending on whether the desired throttle plate angle is larger or smaller than a particular basic setting of the throttle plate angle. The integrator 16 then performs an integration in the direction of higher and lower output values as controlled by the logical selection circuit 18.

When the driver-settable member 10 is depressed to a degree which corresponds to the basic throttle plate angle, it is intended that the function generator 15 generate no signal at all. This position of the driver-settable member 10 corresponds to the domain in which the mechanical pressure point generator provides a sensible change in the foot pressure necessary to actuate the settable member 10. The VCO 17 should also provide no signal in this condition so that the integrator 16 will retain its output value at a constant level and thus will provide a constant set-point for the vehicle speed. If the adjustment member 10 is set for a throttle angle greater than the basic angle, the logical selection circuit 18 sets the integrator 16 to provide upward integration. At the same time, the function generator 15 delivers a signal of suitable value which causes the VCO 17 to generate an output signal of an associated frequency. Accordingly, the integrator 16 integrates upwardly as long as the driver settable member 10 is depressed farther than the basic angle which is intended to correspond to an accelerating process for the engine.

Conversely, when the driver settable member 10 is released so that the spring tension causes it to go beyond the pressure point into the decelerating region, the throttle plate angle selected thereby is lower than the basic angle and the logical selection circuit 18 causes the integrator 16 to integrate downwardly at a rate determined by the magnitude of the signal from the function generator 15. The decelerating process is maintained as long as the driver-settable member 10 remains below the neutral zone or pressure point zone.

The output signal of the function generator 15 as a function of the position of the driver settable member 10 is shown in the diagram of FIG. 5. This diagram illustrates four separate domains, i.e., an idling domain ranging from a pedal position of zero to approximately five percent, a decelerating domain ranging from the idling domain to approximately thirty percent of depression of the driver settable member 10. This decelerating range is followed by a cruising or pressure point region which in turn leads into an accelerating region when the driver settable member is depressed beyond the mechanical pressure point, i.e., beyond the basic throttle plate angle. Once the vehicle has reached a desired speed, the driver settable member is placed in the cruising or pressure point domain, and in this position, the speed which the vehicle has then attained is not altered. The slope of the function generator signal proceeds from zero at higher-than-constant rate in both directions. It has been found to be advantageous if the neutral or pressure point region lies between approximately thirty and forty percent of the total control path of the driver settable member 10. In this way, the accelerating domain ranges over sixty percent of the entire adjustment range which permits a very selective and fine adjustment of the intermediate positions.

Figure 6A:
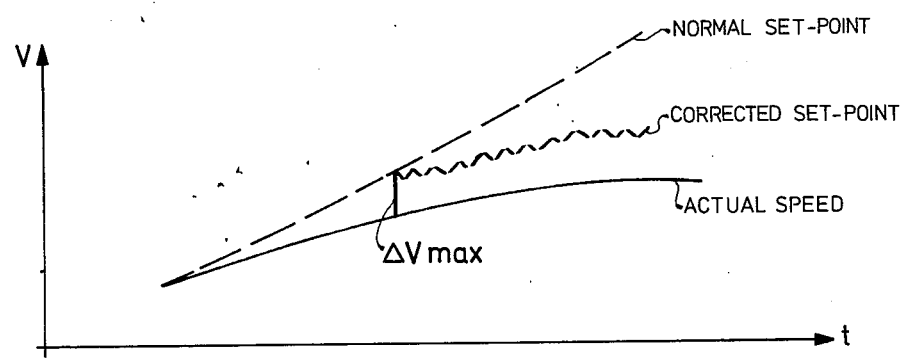
FIGS. 6a, b and c is a set of three diagrams illustrating the three possible cases of set-point signal and actual speed of the vehicle.
Figure 6B:
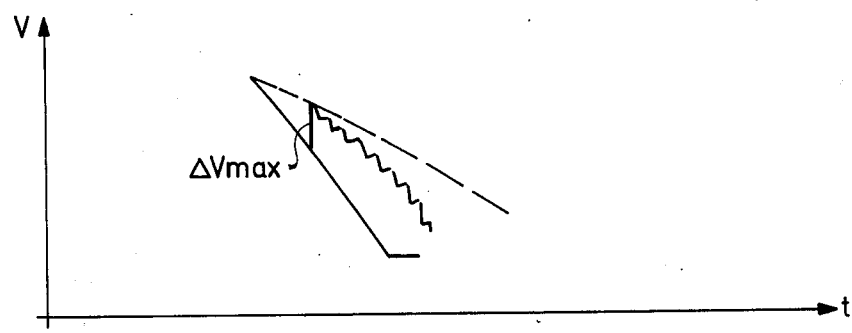

The circuit of FIG. 3 illustrates a provision which accounts for situations that occur during normal operation and which are now discussed with respect to FIG. 6. FIG. 6a is a diagram illustrating the vehicle speed as a function of time in a situation where the driver indicates a constant acceleration, thereby causing the nominal velocity of the vehicle to increase linearly. If the vehicle is incapable of attaining the nominal speed, for example during hill-climbing, the difference between the set-point (nominal) speed and the actual speed is going to increase all the time, and in this case the set-point speed is higher than the actual speed. A similar situation occurs during vehicle braking if the actual speed of the vehicle is reduced faster than the set-point speed can follow. In that case, the set-point speed can also be substantially higher than the actual speed and this condition is illustrated in FIG. 6b.

Figure 6C:
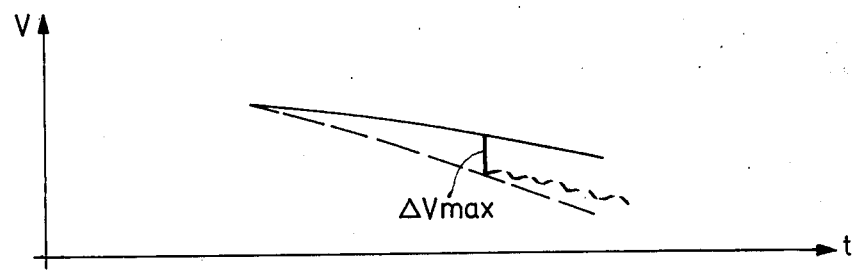

Finally FIG. 6c shows the opposite situation, i.e., when the set-point speed is below the actual speed of the vehicle and this situation may occur when the vehicle is going downhill, for example.

If no provision were made to limit the difference between set-point speed and actual speed, the controller would tend to operate the vehicle in a manner not desired by the driver. This is illustrated most clearly in the case of engine braking, i.e., according to FIG. 6b. Once the driver has ceased using the brakes, the cruise control would immediately cause the vehicle to re-accelerate which is normally not the driver's intention, because the set-point speed would still lie substantially above the actual speed. Such behavior would be distinctly unacceptable to the driver.

In order to correct this characteristic, there is provided an integrator control circuit 20 (see FIG. 3) which receives the output signal from the control amplifier 12 and has an effect on the VCO 17 as well as on the logical selection circuit 18.

The substantial constituents of the integrator control circuit 20 are two threshold switches or comparators which recognize when the difference between the set-point speed and the actual speed exceeds certain predetermined values. In that case, a switchover occurs in the VCO 17 to a higher frequency while the logical selection circuit 18 causes alternating directions of integration. On the average therefore, there is obtained a substantially constant difference between the set-point and actual speeds so that the set-point speed never migrates too far from the actual speed.

It would also be possible to provide an increased frequency signal in one direction of integration whereas to maintain the original frequency in the opposite direction. In that case, one flank of the sawtooth of the corrected set-point value would be parallel to the driver-selected set-point speed line.

FIG. 4 is a complete block diagram of the cruise control mechanism according to the invention. The reference numerals used are identical to those used in FIGS. 1 to 3. An additional feature illustrated in FIG. 4 is an electronic pressure point generator or pressure point maintenance mechanism 25 which may be connected in parallel with the driver-settable member 10 and permits manual operation. The provision of this circuit permits releasing the pedal and resting the driver's foot. In the simplest case, the pressure point generator is a mechanism which generates a tension related to the output value of the driver settable member at the pressure point, i.e., at the basic throttle angle. However, it is also possible to provide a manual control for increasing or decreasing the set-point speed. This type of operation corresponds to the known cruise control systems German Pat. Application No. 2537415.

The final control element 13 is seen in FIG. 4 to include a final control amplifier 30 which engages a power output stage 31 which actuates the final element 33 that sets the throttle valve 32. The angular position of the throttle valve is transduced by a transducer 34 and is fed back to the final control amplifier 30.

Positioned between the control amplifier 12 and the final control element 13 is a coupling circuit, embodied in this case as a highest-value-selection-circuit 40, which receives the output signal of the control amplifier 12 as well as the output signal of an idling rpm governor 41. The idling rpm governor 41 receives an idling speed set-point value as well as a signal related to actual engine speed. It is the function of the coupling circuit 40 to insure that the idling speed of the engine does not fall below its set-point value as a result of anything done by the final control element 13. The box 43 illustrates a speed transducer whose output signal is also fed to the control amplifier 12 which is suitably embodied as a proportional or proportional-differential controller.

The cruise control or speed control system according to the present invention makes it possible to associate the driver-selected position of the pedal with all the advantages of speed control without any further attention and with the additional advantages of idling rpm control independent of load. In manual transmissions, there is obtained an additional starting aid because the idling speed control adjusts for any changes in load due to the engagement of the clutch.

While the motions of the driver-settable member, for example the accelerator pedal of the vehicle, are not the same as those in ordinary vehicles without cruise control, it is easily within the capability of the ordinary driver to become accommodated to this different characteristic after a very short time and thereafter provides great advantages because of the clear association of the driver's intent and the changes in the vehicle speed.

The foregoing relates to a preferred exemplary embodiment of the invention, it being understood that other embodiments and variants thereof are possible within the spirit and scope of the invention.

What is claimed and desired to be secured by Letters Patent of the United States is:

1. A speed control system, especially for use in a vehicle powered by an internal combustion engine; said engine including power adjustment means and said system comprising:
   a final control element for engaging said power adjustment means;
   a control amplifier for actuating said final control element;
   an integrator for delivering an integrated set-point signal to said control amplifier;
   a function generator for generating a set-point control signal for said integrator;
   an arbitrarily settable member for selecting a desired engine speed and for providing an associated input datum to said function generator, said arbitrarily settable member having a mechanical pressure point indicator for providing a sensible pressure point and wherein the position of said member at one side of said pressure point defines a decelerating region, whereas the position on the other side of said pressure point defines an accelerating condition and wherein the position in the vicinity of said mechanical pressure point defines constant engine speed.

2. A speed control system as defined by claim 1, further comprising a selectively engageable electronic pressure point generator connected in parallel with said arbitrarily settable member for maintaining a selected constant input datum to said function generator.

3. A speed control system as defined by claim 1, further comprising a controllable integrator input circuit.

4. A speed control system as defined by claim 3, wherein said controllable integrator input circuit is a voltage-controlled oscillator.

5. A speed control system as defined by claim 3, further comprising an logical selection circuit for defining the direction of integration of said integrator, said logical selection circuit receiving signals from said arbitrarily settable member, and further comprising an integrator control circuit which is engaged by the output of said control amplifier and which provides an output signal to said logical selection circuit.

6. A speed control system as defined by claim 5, wherein said integrator control circuit generates an output signal whenever the difference between the set-point speed and the actual speed exceeds a predetermined value.

7. A speed control system as defined by claim 1, wherein said arbitrarily settable member has a mechanical pressure point indicator for providing a sensible pressure point and wherein the position of said member at one side of said pressure point defines a decelerating region, whereas the position on the other side of said pressure point defines an accelerating condition and wherein the position in the vicinity of said mechanical pressure point defines constant engine speed;
   whereby the output values of said function generator are continuous during a transition between adjacent regions.

8. A speed control system as defined by claim 7, wherein said function generator is so constructed as to provide an output signal whose magnitude increases with greater-than-linear dependence on the difference between the selected speed and a constant speed.

9. A speed control system as defined by claim 1, wherein said arbitrarily settable member has a mechanical pressure point indicator for providing a sensible pressure point and wherein the position of said member at one side of said pressure point defines a decelerating region, whereas the position on the other side of said pressure point defines an accelerating condition and wherein the position in the vicinity of said mechanical pressure point defines constant engine speed; and further comprising an idling region located adjacent the decelerating region and remote from the region of constant speed.

10. A speed control system as defined by claim 1, wherein said final control element is coupled at least to the throttle valve of said internal combustion engine.

11. A speed control system as defined by claim 1, further comprising a coupling circuit connected between said control amplifier and said final control element and connected to receive signals related to the idling speed of the engine to thereby modify the output signal of said control amplifier.

12. A speed control system as defined by claim 1, wherein said arbitrarily settable member has a mechanical pressure point indicator for providing a sensible pressure point and wherein the position of said member at one side of said pressure point defines a decelerating region, whereas the position on the other side of said pressure point defines an accelerating condition and wherein the position in the vicinity of said mechanical pressure point defines constant engine speed; and further comprising a pressure point maintenance mechanism which can be manually actuated.

13. A speed control system as defined by claim 12, further comprising means for adjusting said pressure point in dependence on engine speed.

14. A speed control system as defined by claim 12, wherein said manually actuated pressure point maintenance mechanism includes means for generating acceleration and deceleration signals to be provided to said function generator.

* * * * *